(12) United States Patent
Shenai et al.

(10) Patent No.: US 6,791,298 B2
(45) Date of Patent: Sep. 14, 2004

(54) MONOLITHIC BATTERY CHARGING DEVICE

(75) Inventors: Krishna Shenai, Naperville, IL (US); Siamak Abedinpour, Chandler, AZ (US)

(73) Assignee: Shakti Systems, Inc., Lisle, IL (US)

( * ) Notice: Subject to any disclaimer, the term of this patent is extended or adjusted under 35 U.S.C. 154(b) by 0 days.

(21) Appl. No.: 10/288,177

(22) Filed: Nov. 5, 2002

(65) Prior Publication Data

US 2003/0090237 A1 May 15, 2003

Related U.S. Application Data

(60) Provisional application No. 60/337,301, filed on Nov. 5, 2001.

(51) Int. Cl.⁷ ............................................. H01M 10/46
(52) U.S. Cl. .................................................... 320/128
(58) Field of Search ................................. 320/123, 128, 320/134, 136, 137, 140; 323/351, 282, 284

(56) References Cited

U.S. PATENT DOCUMENTS 5,006,782 A    4/1991  Pelly
5,818,214 A *  10/1998 Pelly et al. .................. 323/351
6,137,280 A *  10/2000 Ackermann et al. ........ 323/354
6,147,478 A    11/2000 Skelton et al.
6,184,660 B1   2/2001  Hatular
6,437,549 B1 * 8/2002  Takagishi .................... 323/282
2003/0111983 A1 * 6/2003 Miller et al. ................. 323/225

* cited by examiner

*Primary Examiner*—Edward H. Tso
(74) *Attorney, Agent, or Firm*—McDonnell Boehnen Hulbert & Berghoff LLP (57) ABSTRACT

A monolithically formed battery charger may be fabricated as an integral part of a multifunctional integrated circuit or as independent monolithically formed integrated circuit. The monolithically formed battery charger includes at least one step-down converter having a given duty ratio coupled to a battery-terminal interface that provides a stepped-down output voltage and current that may be used to charge a rechargeable battery.

The step-down converter includes one or more cascaded monolithically-formed synchronous-buck regulators operating at a frequency of at least one megahertz. Each regulator may include a capacitor, inductor, controller, switch, and rectifier. When cascaded, the high-side output node of a preceding synchronous-buck regulator is connected to the switch in a successive synchronous-buck regulator.

29 Claims, 4 Drawing Sheets

MONOLITHIC BATTERY CHARGING DEVICE

PRIORITY AND RELATED APPLICATIONS

The present patent application claims priority under 35 U.S.C. §119(e) to U.S. Provisional Patent Application Serial No. 60/337,301 entitled "Monolithic Battery Charger," filed on Nov. 5, 2001, the full disclosure of which is incorporated herein by reference.

The following references to non-provisional patent applications are incorporated by reference herein:

"DC—DC Converter with Resonant Gate Drive" to Shenai et al., filed concurrently herewith;

"Multislice DC—DC Converter" to Shenai et al., filed concurrently herewith;

"DC—DC Converter with Current Control" to Shenai et al., filed concurrently herewith; and "Synchronous Switched Boost and Buck Converter" to Shenai et al., filed concurrently herewith.

BACKGROUND

1. Field

The field of the invention is related to battery charging devices, and more particularly to monolithically formed battery charging devices having at least one voltage step-down direct-current-to-direct-current converter.

2. Related Art

In general, direct-current-to-direct-current ("DC—DC") converters fall into two categories, namely step-up converters and step-down converters. As the category names imply, a step-up DC—DC converter provides an output voltage that is stepped up from (i.e., greater than) an applied input voltage, and a step-down DC—DC converter provides an output voltage that is stepped down from (i.e., less than) an applied input voltage. Because of the conservation of energy and physical dissipation losses, the current that is output from the DC—DC converter must be less than the input current in the case of step-up converter.

Because the voltage output in a step-down DC—DC converter is less than the input voltage, the output current can be greater than the input current, keeping in mind that the input power should be approximately equal to the output power minus circuit-load losses. Given that input power and output power will be approximately equal, then the circuit can be modeled by the by the transfer function $V_{out}=D*V_{in}$, wherein $V_{out}$ is the output voltage, $V_{in}$ is the input voltage, and D is the duty ratio (also known as the step-down ratio); or by the transfer function $I_{out}=I_{in}/D$, wherein $I_{out}$ is the output current, and $I_{in}$ is the input current. Thus, the duty ratio of the output voltage to the input voltage is approximately equal to the ratio of the input current to the output current.

The duty ratio is useful in designing devices that employ step-down DC—DC converters. In practice, step-down DC—DC converters are able to power devices with various voltages and corresponding current requirements by employing the duty ratio designed into the DC—DC converter. For instance, a step-down DC—DC converter can provide enough drive current to charge a battery even though the input current may be insufficient to charge the battery load.

Existing step-down DC—DC converters normally include an internal oscillator to convert or chop a direct-current (DC) input supply signal into alternating current (AC) signal. After conversion, the DC—DC converter rectifies and filters the AC signal to provide a final desired DC voltage. The oscillator used in some prior art DC—DC converters is a free running type that operates at a constant frequency. To minimize dissipation of energy in such circuits, driver circuitry is connected to the oscillator to convert or otherwise chop the DC input supply signal using pulse width modulation (PWM) techniques into a series of pulses or a pulse train. The width of each pulse in the pulse train may be determined by the desired output of the DC—DC converter. The switching frequency is normally chosen to optimize switching efficiency and the gain-phase characteristics of filtering devices.

Such prior art DC—DC converters typically include a switch that connects a high-side output of an external DC input supply to an external series inductor, that in turn is connected to an external series capacitor, which is coupled to the low-side output of the DC input supply. The DC input supply provides a signal to drive the combination of the external inductor and capacitor so that a desired voltage and current combination may be supplied between an output node, i.e., the node connecting the capacitor and the inductor, and the low-side output node of the DC input supply. Generally, the inductor and capacitor combination are selected to provide a desired output voltage level that corresponds to the duty cycle of the switch.

Additionally, prior art DC—DC converters have control circuitry to control the duty cycle of the switch. In these prior art DC—DC converters, this control circuit adjusts the duty cycle of the switch by sensing the output voltage across the capacitor and then adjusting PWM of the switch. Due to operating inefficiency in the duty cycle of the switch, among other things, prior art DC—DC converters use one or more external transformers to achieve large duty ratios, which limit the design and manufacture of monolithic the DC—DC converters having large duty ratios.

Ultimately, these transformers may prevent the design and manufacture of monolithic DC—DC converters having large duty ratios or dramatically increase the package size of the DC—DC converters making manufacture cost unacceptable. In addition, as noted above, prior art step-down DC—DC converters suffer from having to employ external inductors and capacitors due to many factors, including the resonant frequency of the inductors, capacitor, and battery load.

To overcome some of these limitations, some manufacturers have resorted to monolithic DC—DC converters. Known monolithic DC—DC converters, however, suffer from high inductor current, inductor saturation and switch saturation, which result in low efficiency and small duty ratios. Another known step-down DC—DC converter includes a resonant gate drive for very low voltage applications, but the circuit topology does not use the current feedback, which is generally required in a battery charger application.

Therefore, what is needed is an efficient, monolithically-formed-step-down DC—DC converter that can supply enough drive current to charge a battery without inductor and switch saturation. Further, such monolithically formed step-down DC—DC converter should provide small as well as large duty ratios.

SUMMARY

In an exemplary embodiment, a monolithic battery charger includes a step-down converter having a duty ratio in the range of approximately 10 to 95 percent. Each of the step-down converters may be formed from a monolithically formed buck-type regulator coupled to or integrated with at least one monolithically or discretely formed capacitor, and a monolithically or discretely formed inductor in a standard buck configuration. Alternatively, the at least one monolithically or discretely formed capacitor, and the monolithically or discretely formed inductor may be integral to the monolithically formed buck-type regulator.

Each of the monolithically formed buck-type regulators may include a monolithic controller, a monolithic switch, and a monolithic rectifier. Unlike a standard buck configuration, however, the controller operates at a switching frequency of at least one megahertz (MHz). In addition to the step-down converter, the monolithic battery charger includes a battery-terminal interface connected to the step-down converter. This battery-terminal interface provides an output voltage and current that may be used to recharge a rechargeable battery. In one embodiment, the monolithic battery charger may be directly incorporated into a rechargeable battery.

In another exemplary embodiment, a monolithic battery charger includes at least one step-down converter that has a duty ratio in the range of approximately 10 to 90 percent. Each of the step-down converters may be formed from a plurality of cascaded (serially connected) monolithically formed buck-type regulators, as noted above. Each of these serially connected monolithically formed buck-type regulators has a duty ratio of in the range of approximately 10 to 95 percent. And the controller in each of the serially connected monolithically formed buck-type regulators operates at a switching frequency of at least one MHz.

BRIEF DESCRIPTION OF THE DRAWINGS

Exemplary embodiments of the invention are described below in conjunction with the appended Figures, wherein like reference numerals refer to like elements in the various Figures, and wherein.

DETAILED DESCRIPTION OF PRESENTLY PREFERRED EMBODIMENTS

In the following detailed description, numerous specific details are set forth in order to provide a thorough understanding of the invention. However, it will be understood that the present invention may be practiced without these specific details. In other instances, well-known methods, procedures, components and circuits have not been described in detail, so as not to obscure the present invention. Further, the presently preferred embodiments disclosed are for exemplary purposes only and other embodiments, such as those disclosed in the concurrently filed non-provisional applications entitled (i) "DC—DC Converter with Resonant Gate Drive," (ii) "DC—DC Converter with Current Control," (iii) "Synchronous Switched Boost and Buck Converter," and (iv) "DC—DC Converter with Single Gate Drive," may be employed in lieu of or in combination with of the embodiments disclosed.

1. Exemplary Architecture

Figure 1:
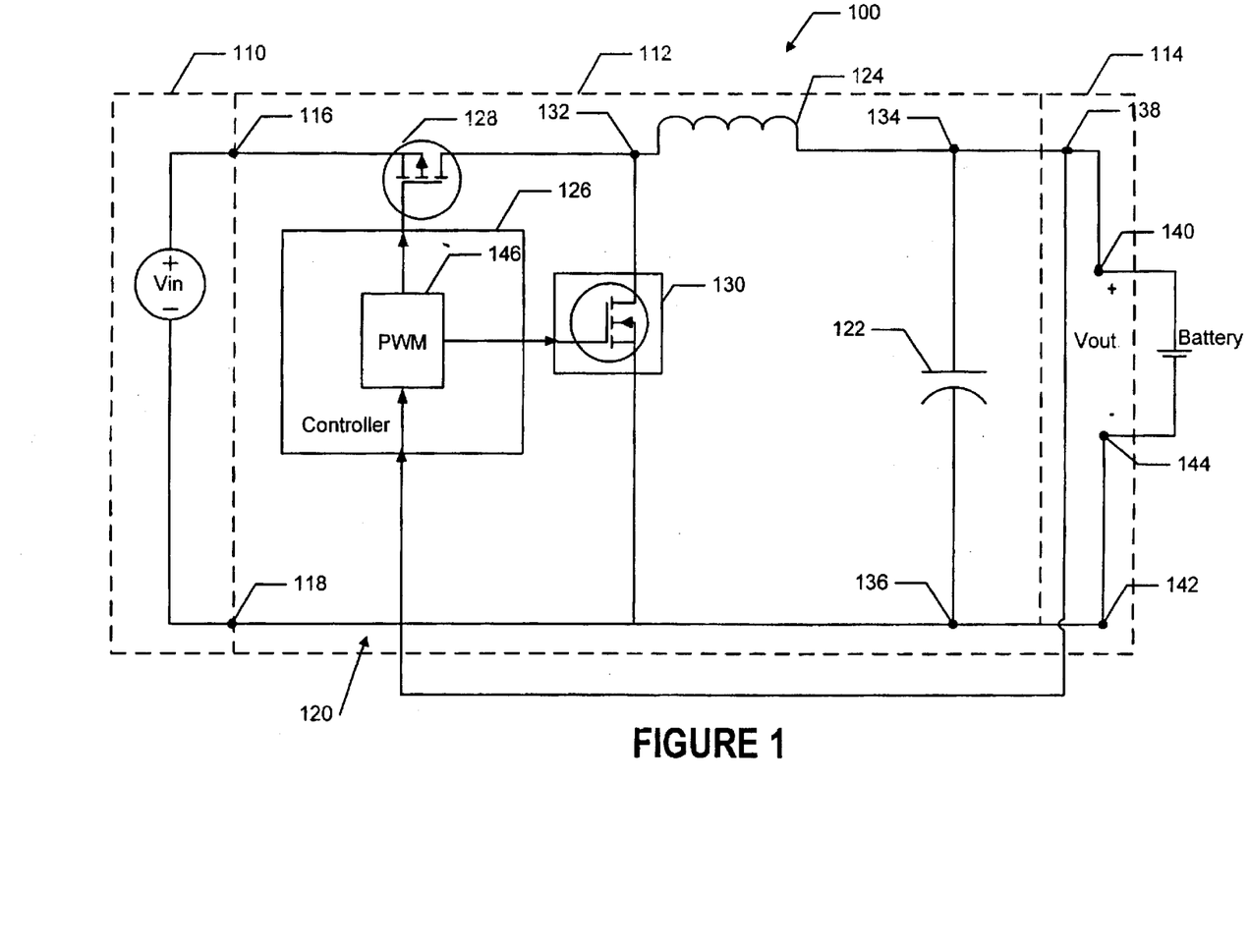
FIG. 1 is a schematic view of a monolithic battery charger in accordance with an exemplary embodiment.

FIG. 1 is a schematic diagram of a monolithic battery charger 100. The battery charger 100 may be fabricated as (i) an integral part of a multifunctional integrated circuit, (ii) one or more independent monolithically formed integrated circuits, (iii) a single independent monolithically formed integrated circuit, and/or (iv) any other monolithic or hybrid formation.

FIG. 1 illustrates an external DC input supply 110 coupled to a step-down converter 112 having a given duty ratio. The step-down converter 112, in turn, is coupled to a battery-terminal interface 114, which supplies an output voltage and output current having an output power ranging from approximately 1 watt to approximately 100 watts that may be used to charge a rechargeable battery. The output power, however, may be greater than or less than this exemplary range.

It is contemplated that the step-down converter 112 and other components of the battery charger 100 may be fabricated using Silicon/Gallium Arsenide (Si/GaAs), Silicon/Germanium (SiGe), and/or Silicon/Carbide (SiC) fabricating techniques. Included amongst these techniques are Complementary Metal Oxide Semiconductor (CMOS) fabrication processes, Bipolar Complementary Metal Oxide Semiconductor (BiCMOS) fabrication processes, Heterojunction Bipolar Transistor (HBT) fabrication processes, and/or Metal Semiconductor Field Effect Transistor (MESFET) fabrication processes.

The external DC input supply 110 may be any DC supply capable of supplying between a high side terminal 116 and a low-side or ground terminal 118 an input voltage from the range of approximately 1.5 volts to approximately 20 volts, and a corresponding input current from approximately 1 mA to approximately 10 A. The value of the input voltage and current supplied by the external DC input supply, however, may be higher or lower than these ranges. For instance, the values may be adjusted for dissipation losses caused by the attached circuitry and caused by any terminal interconnections between external DC input supply 110, the step-down converter 112, and battery-terminal interface 114.

In one alternative, the value of input voltage may be selected by starting with the desired output voltage and multiplying it by the inverse of the duty ratio. Similarly, the value of the corresponding input current may be selected by starting with the desired output current and multiplying it by the duty ratio. Other functions may be used for determining the value of the input voltage and corresponding input current, as well.

As noted above, coupled to the DC input supply 110 is the step-down converter 112. The step-down converter 112 includes a monolithically-formed DC—DC converter 120 in standard buck-style configuration (hereinafter referred to as a "synchronous-buck regulator"), which may include several components including at least one (i) monolithically or discretely formed capacitor 122, (ii) monolithically or discretely formed inductor 124, (iii) monolithically-formed controller 126, (iv) monolithically-formed switch 128, and (v) monolithically-formed rectifier 130.

In standard buck-style configuration, the switch 128, when closed, couples the high-side terminal 116 of the DC input supply 110 to a first terminal of the inductor 124 at a first node 132. The rectifier 130 is coupled between the first node 132 and the ground terminal 118 of DC input supply 110, so that when the switch 128 is closed the voltage across the rectifier 130 in an ideal circuit is approximately the input voltage.

In the standard buck-type configuration, one side of the capacitor 122 is coupled to a second side of the inductor 124 at a high-side output node 134. And a second side of the capacitor 122 is coupled to the ground terminal 118 of DC input supply 110 at the low-side output node 136.

As noted above, the battery-terminal interface 114 is coupled to the step-down converter 112. In one embodiment, the battery-terminal interface 114 includes a high-side-input terminal 138 coupled to a high-side-output terminal 140. In another embodiment, the high-side-input terminal 138 and the high-side-output terminal 140 are the same terminal. The battery-terminal interface 114 may also include a low-side-input terminal 142 coupled to a low-side-output terminal 144. Paralleling, the high-side terminal of the battery-terminal interface, the low-side-input terminal 142 and the low-side-output terminal 144 may be the same terminal. To couple the step-down converter 112 to battery-terminal interface 114, the high-side-output node 134 of the step-down converter 112 may be coupled to the high-side-input terminal 138, and the low-side-output node 136 of the step-down converter 112 may be coupled to the low-side-input terminal 142. The output voltage and current that emanates from the battery-terminal interface 114 may be supplied between the high-side-output terminal 140 and the low-side-output terminal 144.

Referring to the components of the monolithically-formed DC—DC converter 120, the architecture of switch 128 may include (i) one or more enhancement or depletion mode P-channel metal oxide semiconductor (PMOS) transistors, (ii) one or more enhancement or depletion mode N-channel metal oxide semiconductor (NMOS) transistors, (iii) one or more PMOS switches, (iv) one or more NMOS switches, and/or (v) any other monolithic switch capable of switching at frequencies of at least one MHz. The architecture of rectifier 130 may include (i) one or more diodes; (ii) one or more synchronous rectifiers, which may be constructed from one or more enhancement or depletion mode NMOS or PMOS transistors; and/or (iii) any other monolithic rectifier having the ability to switch from a conducting state to a non-conducting state at a frequency in excess of approximately one MHz.

In one exemplary embodiment, when the architecture of switch 128 and the rectifier 130 are configured as transistors or semiconductor switches, the switch 128 and the rectifier 130 may be both constructed from the same type topology, e.g., the same NMOS or PMOS material. The switch architecture and the rectifier architecture, however, are preferably constructed as transistors or semiconductor switches having opposite type conduction channel materials. For example, when the switch 128 is constructed from PMOS, the rectifier 130 is preferably constructed from NMOS, and vice versa. One advantage of this topology is simplification of the controller 126.

This simplification is realized by the reduction in number of signals, and corresponding circuit traces, to switch 128 and the rectifier 130. Because the switch 128 and the rectifier 130 need to operate out of phase, one signal (from, e.g., a single gate driver) can control both, as opposed to when the switch 128 and the rectifier 130 are constructed with the same topology. In this opposite conduction channel configuration, delay mechanisms might not be necessary to prevent both the switch 128 and the rectifier 130 from turning on at the same time (which could happen if two of the same type conduction channel devices are used.).

In the opposite conduction channel configuration, when the rectifier 130 comprises a NMOS type rectifier, the physical gate length of the PMOS type switch to 128 is generally three to four times the gate length of the NMOS rectifier for the PMOS type switch to achieve same current carrying capacity and similar switch speeds as the NMOS rectifier. Given that the physical size of the PMOS type switch is larger than the NMOS type rectifier, which ultimately effects circuit and die size, NMOS type switches and rectifiers are preferred over PMOS type switches and rectifiers.

In one embodiment, the inductor 124 may be fabricated as a thin-film inductor having a value of approximately 100 millihenry and below. These thin film inductors may be formed atop, but are preferably integrated into, the same package or wafer die as the synchronous buck converter 120. While the inductor 124 may be formed directly atop the synchronous buck converter 120, one or more insulating or facilitative thin-film layers may separate the inductor 124 from the synchronous buck converter 120. These facilitative layers may include one or more sacrificial layers, (i.e., material used during processing to construct the final product, but not present in the final product), and/or one or more beneficial layers (i.e., material used during processing to construct the final product, and present in the final product).

Alternatively, the inductor 124 may be formed as a monolithic or discrete, off-chip, coil or spiral wire-wound inductor in (i) a hermetically-sealed (e.g., ceramic encased) leaded package, (ii) a hermetically-sealed surface mount, and/or (iii) flip chip form. Such inductors may be similar to the types of inductors commonly used in radio frequency (RF) type circuits operating in the range from about two Mhz to about five Mhz. These inductors are available from such suppliers as Murata Electronics North America, Inc., having offices at Corporate Headquarters 2200 Lake Park Drive, Smyrna, Ga. 30080-7604 U.S.A.; Bourns Inc., having offices at 1200 Columbia Avenue, Riverside, Calif. 9250, U.S.A.; CoilCraft having offices at 1102 Silver Lake Road, Cary Ill. 60013, U.S.A.; U.S. Microwaves A Division Of Semiconix Corporation having offices at 2964–2966 Scott Blvd Santa Clara, Calif. 95054, U.S.A.; Toko America, Inc. having offices at 1250 Feehanville Drive Mt. Prospect, Ill. 60056, U.S.A.; Kyocera America, Inc. having offices at 8611 Balboa Ave. San Diego, Calif. 92123-1580, U.S.A. Each of these suppliers can provide high accuracy, high Q inductors for high frequency as well as power applications. Other inductor materials and types, and other manufacturers may be used as well.

In addition to the other monolithic components, the architecture of the capacitor 122 may include a monolithically formed coupling capacitor having a storage capacity of approximately a few nanofarads and below. Similar to the inductor 124, the capacitor may be fabricated as a thin-film capacitor; similar in construction of the types commonly used in radio frequency (RF) type circuits operating in the range from about two Mhz to about five Mhz. These thin film capacitors may be preferably formed atop, but are preferably integrated into, the same package or wafer die as the synchronous buck converter. While the capacitor 122 may be formed directly atop the synchronous buck converter 120, one or more insulating or facilitative thin-film layers may separate the capacitor 124 from the synchronous buck converter 120.

Alternatively, the capacitor 122 may be formed as a monolithic or discrete, off-chip, capacitor in (i) a hermetically-sealed (e.g., ceramic or tantalum encased) leaded package, (ii) a hermetically-sealed surface mount, and/or (iii) flip chip form. These capacitors are available from any of the suppliers listed above. And each of these suppliers can provide capacitors for high frequency applications that exhibit high accuracy, and power low dissipation. Other capacitor materials and types, and other manufacturers may be used as well.

Referring again to the components of the monolithically-formed DC—DC converter 120, the controller 126 causes the switch 128 to operate at a frequency in excess of approximately one MHz. In such an embodiment, the controller may include a pulse-width-modulator-feedback circuit 146 that includes a ramp generator operating in excess of approximately one MHz and an output to drive the switch 128 between a substantially conductive state (the "ON" state) and a substantially non-conductive state (the "OFF" state).

2. Exemplary Operation

The cyclical operation of an exemplary synchronous-buck regulator 120 to accomplish a voltage step-down from the DC input supply voltage $V_{in}$ is as follows. Each time the switch 128 is in the ON state, the difference between $V_{in}$ supplied between the high side terminal 116 and the ground terminal 118 and the output voltage $V_{out}$ supplied between high-side output node 134 and the low-side output node 136 appears across inductor 124, which causes the current exiting the first node 132 to increase linearly through the inductor.

When the output voltage $V_{out}$ reaches a desired or predetermined value, the controller 126 senses a change in the output voltage $V_{out}$ and adjusts the duration of the pulse width modulation of the switch 128, accordingly. This adjustment may cause the switch to change from an ON state to an OFF state. Within a short delay period of approximately 0 to approximately 100, and preferably about 10 nanoseconds, the controller 126 may adjust the duration of the pulse width modulation of the rectifier 130. This may cause the rectifier 130 to switch from an OFF state to and ON state, assuming that the rectifier 130 is a synchronous rectifier. The delay period may be greater than and less than these numbers, and is preferably a sufficient delay to obtain optimal performance and efficiency. Additionally, the delay period may depend on the physical characteristics of the switch 128, the rectifier 130, and the controller 126.

If, on the other hand, the rectifier 130 is a diode (e.g., as a Schottky diode), the switching characteristics of the diode determines the amount of delay after switch 128 is turned to the OFF state. In an exemplary embodiment, the delay period for switching such diode should be comparable to the delay period of the synchronous rectifier.

Immediately after the switch 128 switches to the OFF state, the inductor current "freewheels" through rectifier 130 and through any load, including the load of any battery being charged, connected across the high-side output node 134 and the low-side output node 136. More specifically, once switch 128 turns off, the voltage across the rectifier 130 becomes negative and when the rectifier 130 reaches the forward bias voltage drop, it is simultaneously switched (or if the rectifier 130 comprises as diode, switches) from an OFF state to an ON state. After the rectifier 130 switches to the ON state, current flows through the forward-biased body diode of rectifier 130 and through the channel of the FET. Thereafter, the energy stored in the inductor 124 begins to decrease as current flows to the capacitor 122 and/or the load. Eventually, depending on the load condition, capacitor 122 will discharge through any connected load until the voltage at the output 134 begins to decrease.

The pulse-width pulse-width-modulator-feedback circuit 146 compares the output voltage $V_{out}$ with a predetermined reference value to generate an error voltage signal. The controller 126 triggers the switch 128 to switch from the OFF state to the ON state in accordance with a ramp generator signal in conjunction with the error voltage signal, as is known in PWM controllers.

3. Combined Voltage and Current Feedback Control

Figure 2:
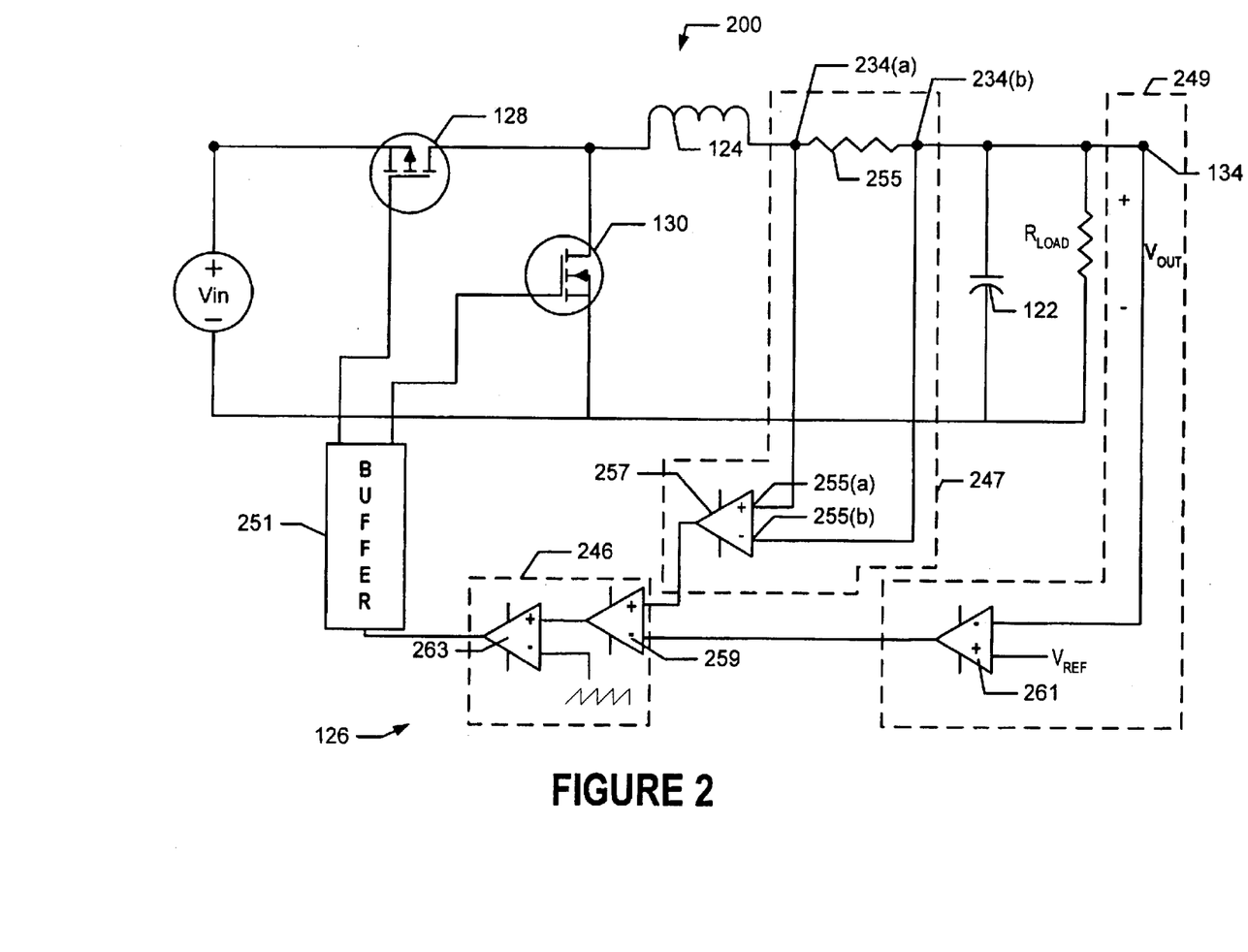
FIG. 2 is a second schematic view of a monolithic battery charger in accordance with an exemplary embodiment.
Figure 3:
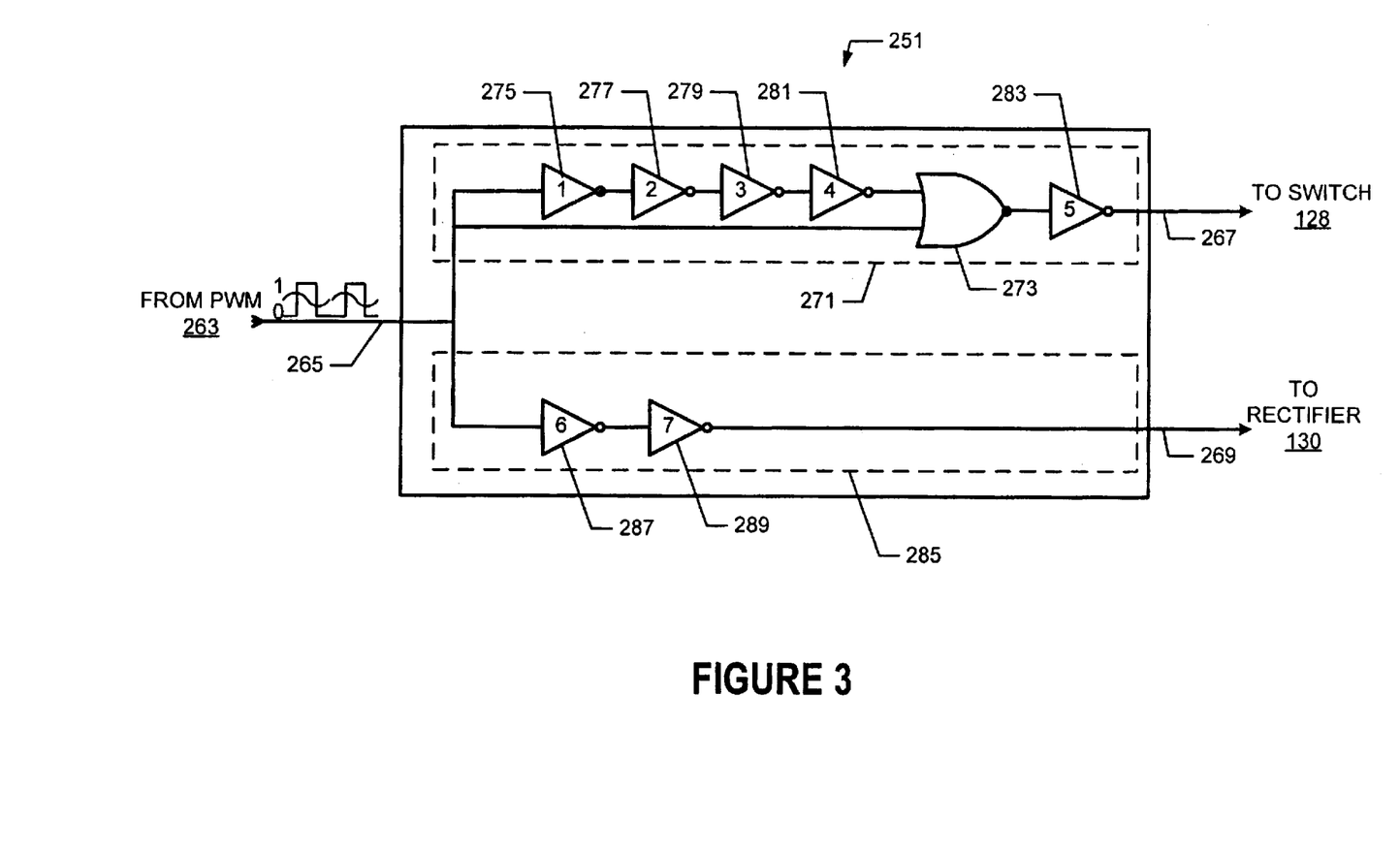
FIG. 3 is a schematic view of a buffer driver used for regulation of the monolithic battery charger in accordance with an exemplary embodiment.

Referring now to FIG. 2, a schematic diagram of a monolithic battery charger 200 is provided. The battery charger 200 illustrated in FIG. 2 is similar to the battery charger 100 illustrated in FIG. 1 in most respects, except as described herein or otherwise noted.

In the embodiment illustrated in FIG. 2, the controller 126, which operates in excess of one MHz, may include a current-sense feedback circuit 247 in combination with a voltage-controlled-feedback circuit 249 to prevent or limit overregulation caused by abrupt changes in the output voltage $V_{out}$ sensed by the voltage-controlled-feedback circuit 249. Both the current-sense feedback circuit 247 and the voltage-controlled-feedback circuit 249 feed "error" signals to a pulse-width-modulator-feedback circuit 246. Based on the error signals, the pulse-width-modulator-feedback circuit 246 may adjust the duration or duty cycle of its outputted pulse-width signal. This adjusted-pulse width signal, which ultimately acts as a single gate driver for the switch 128 and the rectifier 130, in turn drives a buffer driver 251. Using the adjusted-pulse width signal, the buffer driver 251 simultaneously or otherwise synchronously drives the switch 128 and the rectifier 130 between their ON state and the OFF state, so that the state of the switch 128 and the state of the rectifier 130 operate as polar opposites.

Although illustrated with both current-sense feedback circuit 247 and a voltage-controlled-feedback circuit 249, the monolithic battery charger 200 may include only a current-sense feedback circuit. Alternatively, the monolithic battery charger 200 may have only a voltage-controlled-feedback circuit, as described above.

The current-sense-feedback circuit 247 includes a sense resistor 255 coupled between the inductor 124 and the capacitor 122. The sense resistor 255 has a first end coupled at a first-sense node 234(a) and a second end coupled at a second-sense node 234(b). Coupled across the sense resistor 255 are first and second inputs 255(a), 255(b) of a current-sense-feedback amplifier 257, which is preferably a differential amplifier having an output in addition to such first and second inputs. The current-sense-feedback amplifier 257 is operable to provide from its output an output signal, hereinafter referred to as a "current-sense-error signal," which is proportional to the voltage detected the across the sense resistor 255. And because of the location of the sense resistor 255, the current-sense-error signal is directly proportional to the current of the inductor 124.

The output of the current-sense-feedback amplifier 257 is coupled to a combined-error amplifier 259 of the pulse-width-modulator-feedback circuit 246. The combined-error amplifier 259 is preferably a differential amplifier having a first input, a second input and an output. The current-sense-error signal is fed to the first input of the combined-error amplifier 259 by the output of the current-sense-feedback amplifier 257.

Coupled to the second input of the combined-error amplifier 259 is an output of the voltage-controlled-feedback circuit 249. The voltage-controlled-feedback circuit 249, which may sense changes in the output voltage $V_{out}$, feeds the second input of the combined-error amplifier 259 with an error output signal that is proportional to changes in $V_{out}$. This error output signal is hereinafter referred to as a "voltage-sense-error signal." To facilitate providing such an output signal, the voltage-controlled-feedback circuit 249 includes a voltage-sense-feedback amplifier 261 (e.g., a differential amplifier) having a first input coupled to high-side output node 134. The voltage-sense-feedback amplifier 261 is operable to detect $V_{out}$ or some voltage division thereof, and reference voltage $V_{ref}$ that is fed to its second input.

The current-sense-error signal provided to the first input of the combined-error amplifier 259 provides varying reference voltage for comparison with the voltage-sense-error signal provided to the second input of the combined-error amplifier 259. Based upon the current-sense error and voltage-sense error signals, the combined-error amplifier 259 feeds to a first input of a pulse-width-amplifier 263 a combined-error-output signal that may be used to adjust the duration of a pulse-width-modulation signal that is provided to a second input of the pulse-width-amplifier 263. An output of the pulse-width-amplifier 263 provides the adjusted-pulse-width-modulation signal, which acts as a single gate driver for driving the buffer driver 251, and in turn the switch 128 and the rectifier 130.

Figure 4:
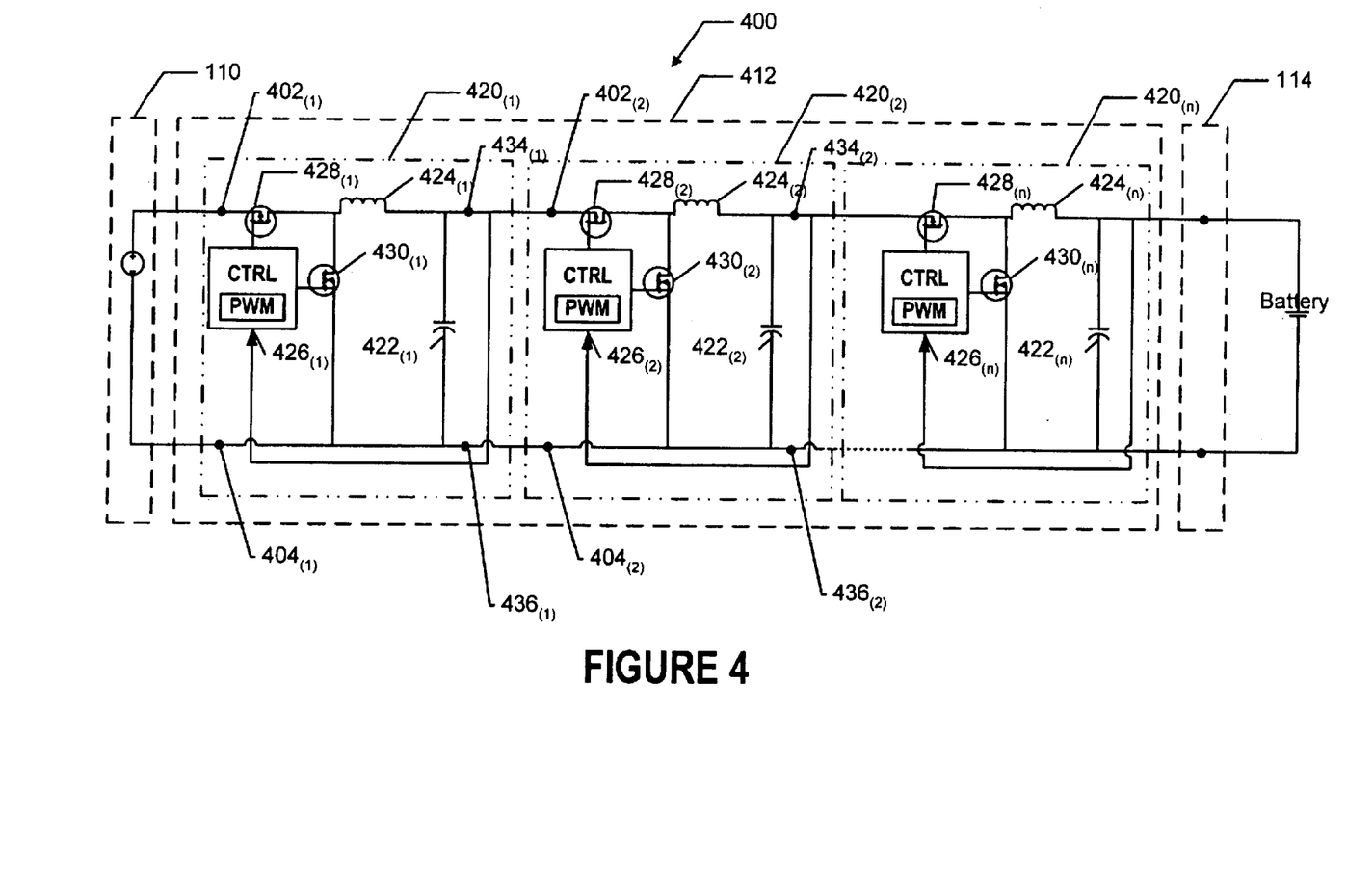
FIG. 4 is a third schematic view of a monolithic battery charger in accordance with an exemplary embodiment.

As noted, the buffer driver 251 simultaneously or otherwise synchronously drives the switch 128 and the rectifier 130 between their respective and polar opposite ON states and the OFF states. The buffer driver 251 may include one or more delay mechanisms to insure that when the switch 128 is in its ON state, the rectifier 130 is in its OFF state, and vice-versa. Referring now to FIG. 4, an exemplary buffer driver 251 is illustrated. The buffer-driver 251 includes an buffer-driver input 265 coupled to the output of the pulse-width-amplifier 263, a first-buffer-driver output 267 coupled to the switch 128, and a second-buffer-driver output 269 coupled to the rectifier 130.

Coupled between the buffer-driver input 265 and the first-buffer-driver output 267 is a first-logic-switch-driver-circuit 271 that includes a NOR gate 273. The NOR gate 273 has an output, a first input directly coupled to the buffer-driver input 265 and a second input coupled to the buffer-driver input 265 via four inverters, namely a first inverter 275, a second inverter 277, a third inverter 279, and a fourth inverter 281. The output of the NOR is coupled to a fifth inverter 283, which in turn is coupled to the first-buffer-driver output 267.

Similarly, coupled between the buffer-driver input 265 and the second-buffer-driver output 269 is a second-logic-switch-driver circuit 285. The second-logic-switch-driver circuit 285 has an input directly coupled to the buffer-driver input 265 and an output directly coupled to the second-buffer-driver output 269. Coupled to the input is a sixth inverter 287 that in turn is coupled to a seventh inverter 289. The seventh inverter 289 in turn is coupled to output of the second-logic-switch-driver circuit 285.

4. Buffer Driver Operation

The buffer driver 251 may operate as follows. When fed into the buffer-driver input 265, the adjusted-pulse-width-modulation signal is fed to both the first and second-logic-switch-driver-circuit 271, 285. Because of the propagation delay of each of the inverters and the NOR gate, the adjusted-pulse-width-modulation signal that is fed to the buffer-driver input 265 insures that when the switch 128 is in its ON state, the state of the rectifier 130 is in its OFF state, and vice-versa.

Starting with a transition from a low state to a high state of the adjusted-pulse-width-modulation signal that is fed directly to its first input, the NOR gate 273 of the first-logic-switch-driver-circuit 271 produces (or otherwise transitions from a high state signal to) a low state signal, regardless of the state of its other input. This low state signal is fed to the fifth inverter 283, which inverts it to a high state signal. The high state signal is then fed to the switch 128. When comprised of an enhancement-mode-p-channel MOSFET, this high state signal causes the switch 128 to enter its ohmic region and switch to its OFF state.

Because the NOR gate 273 and the fifth inverter 283 are in series, the high state signal that is fed to the switch 128 lags behind the high state of the adjusted-pulse-width-modulation signal by the combined propagation delay of the NOR gate 273 and the fifth inverter 283. While the propagation delay of the NOR gate 273 and the fifth inverter 283 may be of the same duration, preferably and in practice, the propagation delay of NOR gate 273 is less than the propagation delay of the fifth inverter 283.

When the transition from the low state to the high state of the adjusted-pulse-width-modulation signal is fed directly to the second-logic-switch-driver-circuit 285, the sixth inverter 287 inverts the high state of adjusted-pulse-width-modulation signal to produce a low state signal. This low state signal is fed to the seventh inverter 289, which inverts its incoming signal to produce a high state signal. The high state signal is then fed to the rectifier 130, which when comprised of a enhancement-mode-n-channel MOSFET, causes the rectifier 130 to enter its active region and switch to its ON state.

Like the NOR gate 273 and the fifth inverter 283, the sixth and seventh inverter 287, 289 are in series. And as such, the high state signal that is fed to the rectifier 130 lags behind the high state of the adjusted-pulse-width-modulation signal by the combined propagation delay of the sixth and seventh inverters 287, 289. The propagation delay of the sixth and seventh inverters 287, 289 may be of the same duration or different duration.

In addition, the individual propagation delay of the sixth and seventh inverters 287, 289 may have the same duration as the NOR gate 273 and the fifth inverter 283. Assuming no propagation delay difference for the pinch-off of a MOSFET constructed switch 128 and rectifier 130, preferably and in practice, the combined propagation delay of the sixth and seventh inverters 287, 289 is longer than the combined propagation delay of the NOR gate 273 and the fifth inverter 283. This insures that when the rectifier 130 switches to its ON state, the switch 128 is already in its OFF state.

Returning to the first-logic-switch-driver circuit 271, when the transition from the low state to the high state of the adjusted-pulse-width-modulation signal is fed to the first inverter 275, it inverts the signal, introduces its propagation delay, and feeds the inverted signal to the second inverter 277, which inverts the inverted signal, introduces its propagation delay, and produces a high state signal. The third and fourth inverters 279, 281, which both introduce their respective propagation delays, invert their incoming signals, and ultimately provide a high state signal provided to the NOR gate 273. Because the first input of the NOR gate 273 is already at a high state, the high state signal received on its second input does not change the low state signal emanating from the output of NOR gate (i.e., a high state signal applied to one or both of the NOR gate's inputs will cause the NOR gate 273 to output a low state signal).

When a transition from the high state to a low state of the adjusted-pulse-width-modulation signal is fed to the second-logic-switch-driver-circuit 285, the sixth inverter 287 inverts the low state of adjusted-pulse-width-modulation signal to produce a high state signal. This high state signal is fed to the seventh inverter 289, which inverts its incoming signal to produce a low state signal. The low state signal is then fed to the rectifier 130. When comprised of an enhancement-mode-n-channel MOSFET, the rectifier 130 enters its ohmic region and switches to its OFF state. Given that the sixth and seventh inverter 287, 289 are in series, the low state signal that is fed to the rectifier 130 lags behind the low state of the adjusted-pulse-width-modulation signal by the combined propagation delay of the sixth and seventh inverters 287, 289.

For at least the combined propagation delay of the first, second, third and fourth inverters 275, 277, 279, 281, the output of the first-logic-switch-driver circuit 271 remains unchanged after being fed the high-to-low state transitioning adjusted-pulse-width-modulation signal. Although the low state of the adjusted-pulse-width-modulation signal is fed directly to the first input of the NOR gate 273, the output of the NOR gate 273 continues to provide a low state signal for a period of time up until the fourth inverter 281 provides a low state signal. This period of time may be at least the combined propagation delay of the first, second, third and fourth inverters 275, 277, 279, 281.

When the fourth inverter eventually provides a low state signal to the second input of the NOR gate 273, the output of the NOR gate 273 produces a high state signal that is fed to the fifth inverter 285. The fifth inverter 285 ultimately supplies a high state signal to the switch 128. When comprised of an enhancement-mode-p-channel MOSFET, the switch enters its active region and switches to its ON state. Note that, after a high to low state transition of adjusted-pulse-width-modulation signal, when of the combined propagation delay of the NOR gate 273 and the first, second, third, fourth, and fifth inverters 275, 277, 279, 281 is greater than the combined propagation delay of the sixth and seventh inverters 287, 289, the rectifier 130 switches to its ON state while the switch 128 is still in its OFF state. This insures that the rectifier 130 and switch 128 operate as polar opposites.

Referring back to FIG. 2, each time switch 128 is in the ON state, the difference between $V_{in}$ supplied between the high side terminal 116 and the ground terminal 118 and the output voltage $V_{out}$ supplied between high-side output node 134 and the low-side output node 136 appears across inductor 124, which causes the current exiting the first node 132 to increase linearly through the inductor 124. This, in turn, causes the capacitor 122 to charge and the output voltage $V_{out}$ to increase towards a desired value. When the output voltage $V_{out}$ reaches a desired value, the voltage-sense-feedback amplifier 261 of the voltage-controlled-feedback circuit 249 senses the output voltage $V_{out}$ which is compared to the reference voltage $V_{ref}$ to provide the voltage-sense-error signal to the combined-error amplifier 259.

As the current increases through the inductor 124, the current-sense-feedback circuit 247 via the sense resistor 255 and current-sense-feedback amplifier 257 detects the change in the inductor current and provides the current-sense-error signal to the first input of the combined-error amplifier 259. Since inductor current cannot change instantaneously, the voltage across the current sense resistor 255 likewise cannot change instantaneously. Thus, (i) under steady state conditions, (ii) in response to large transients, and/or (iii) under very low load conditions, this voltage has a small magnitude that varies only incrementally with the rate of change of the current in the inductor 124. As such, the current-sense-error signal provided to the combined-error amplifier 259 by the current-sense-feedback amplifier 257 does not change instantaneously, and provides a smoothing effect to the pulse width regulation.

The output of the combined-error amplifier 259 provides to the pulse-width amplifier 263 a combined-error-output signal that may be used as a varying reference for adjusting the duration or the duty cycle of the pulse-width modulation. This adjustment may cause the buffer driver 251 to drive the switch 128 from an ON state to an OFF state and drive the rectifier 130 from its OFF state to its ON, as described above.

After the switch 128 switches to the OFF state, the inductor current "freewheels" through rectifier 130 and through any load, including the load of any battery being charged, connected across the high-side output node 134 and the low-side output node 136. After the rectifier 130 switches to the ON state, current flows through the forward-biased body diode of rectifier 130 and through the channel of the FET. Thereafter, the energy stored in the inductor 124 begins to decrease as current flows to the capacitor 122 and/or the load. Eventually, depending on the load condition, capacitor 122 will discharge through any connected load until the voltage at the output 134 begins to decrease, and the regulation cycle begins anew.

Unlike the current-sense feedback circuit 247, the voltage-controlled-feedback circuit 249 can provide instantaneous feedback. Although the inductor current cannot change instantaneously, the output voltage $V_{out}$ does change instantaneously in response to the charging of the load. When load conditions change dramatically, for example, at start-up and/or initial connection to or disconnection from the output terminals, any resulting spike in the output voltage $V_{out}$ can cause the voltage-sense-error signal to be large. Without current-sense feedback, a spike in the output voltage $V_{out}$ can cause "over adjustment" of the duration of the pulse-width modulation, which in turn may result in a potential efficiency loss.

Because of the smoothing effect of the inductor current sensing, the combination of a current-sense feedback circuit 247 and a voltage-controlled-feedback circuit 249 provides a faster response to transients when compared to only a current-sense feedback circuit. This combination, however, provides a slower response when compared to only a voltage-controlled-feedback circuit, but such combination advantageously limits overshooting the desired output (and its corresponding inefficient regulation) in response to the large transients.

Other voltage and current sensing techniques may be employed. Other controller configurations, other current-sense feedback circuitry, including sense resistor location are possible as well. Details regarding other voltage and current sensing techniques including an exemplary current-sense controlled system and method may be found in the concurrently filed, U.S. Non-provisional applications entitled "DC—DC Converter with Current Control," and "DC—DC Converter with Resonant Gate Drive," as noted above.

5. Cascaded Buck-Type Regulator Charger Architecture

FIG. 4 is a schematic diagram of a monolithic battery charger 400 in accordance with an embodiment of the invention. The battery charger 400 may be fabricated as (i) an integral part of a multifunctional integrated circuit, (ii) one or more independent monolithically formed integrated circuits, (iii) a single independent monolithically formed integrated circuit, and/or (iv) any other monolithic, and/or hybrid formation.

An external DC input supply 110 is coupled to a step-down converter 412 having a plurality of cascaded or serially connected monolithically formed buck-type regulators, each of which has a given duty ratio that in toto may provide large duty ratios in an highly efficient manner. Because of the relationship of the duty ratio to efficiency, multistage-cascaded topology can produce a large output current efficiently. In this multistage cascaded topology, when each buck-type regulator is designed for efficiency "η" of about 95%, the overall efficiency $\eta_{(overall)}$ is defined by the function: $\eta_{(overall)}=100\times(0.95)^N\%$, wherein N is the number of stages in the multistage topology. Thus, for 2 and 5 stage topologies, the overall efficiency $\eta_{(overall)}$ is 90% and 80%, respectively. As the efficiency of each stage changes, the overall efficiency $\eta_{(overall)}$ likewise changes. Similarly, the overall duty ratio $D_{(overall)}$ for a multistage-cascaded topology is defined by the function $D_{(overall)}=100\times(D_{(individual)}^N\%$. And although $D_{(overall)}$ decreases with the number of cascades, large output currents can be produced efficiently, when each buck-type regulator is designed for high efficiency.

The step-down converter 412 is coupled to a battery-terminal interface 114, which supplies an output voltage and output current that may be used to charge a rechargeable battery. The battery charger 400 as shown in FIG. 4 is similar in most respects to the battery charger 100 shown in FIG. 1, except as described herein.

The step-down converter 412 includes a plurality of cascaded or serially connected synchronous-buck regulators, namely, synchronous-buck regulator $420_{(1)}$, synchronous-buck regulator $420_{(2)}$ . . . and synchronous-buck regulator $420_{(n)}$. While FIG. 4 illustrates a step-down regulator 412 with more than two synchronous-buck regulators, the step down regulator may contain only two synchronous-buck regulators.

Each of the synchronous-buck regulators $420_{(1)}, 420_{(2)} \ldots$ and $420_{(n)}$ have at least one respective (i) monolithically-formed controller $426_{(1)}, 426_{(2)} \ldots$ and $426_{(n)}$, (ii) monolithically-formed switch $428_{(1)}, 428_{(2)} \ldots$ and $428_{(n)}$, and (ii) monolithically-formed rectifier $430_{(1)}, 430_{(2)} \ldots$ and $430_{(n)}$ coupled to a respective (i) monolithically, or discretely formed capacitor $422_{(1)}, 422_{(2)} \ldots$ and $422_{(n)}$, and (ii) monolithically or discretely formed inductor $424_{(1)}, 424_{(2)} \ldots$ and $424_{(n)}$. Similar to the synchronous-buck regulator 120 contained in the step-down converter 112 illustrated in FIG. 1, each of the synchronous-buck regulators $420_{(1)}, 420_{(2)}, \ldots$ and $420_{(n)}$ have respective input terminals and output terminals.

By connecting the output terminals of a preceding synchronous-buck regulator (also referred to herein as a preceding-regulator stage), such as synchronous-buck regulator $420_{(1)}$, to the input terminals of a successive synchronous-buck regulator (also referred to as a successive-regulator stage), such as synchronous-buck regulator $420_{(2)}$, large output currents and duty ratios may be achieved. These large currents may be achieved because each successive synchronous-buck regulator may apply its duty ratio to the output of the preceding-regulator stage, which in turn applies its duty ratio to the output of another preceding preceding-regulator stage, if any.

For instance, the synchronous-buck regulator $420_{(1)}$ includes a high-side input terminal $402_{(1)}$, a low-side input terminal $404_{(1)}$, a high-side output terminal $434_{(1)}$, and a low-side output terminal $436_{(1)}$. And the synchronous-buck regulator $420_{(2)}$ includes a high-side input terminal $402_{(2)}$, a low-side input terminal $404_{(2)}$, a high-side output terminal $434_{(2)}$, and a low-side output terminal $436_{(2)}$. Serially connecting the synchronous-buck regulator $420_{(1)}$ and the synchronous-buck regulator $420_{(2)}$ may be achieved by coupling the a high-side output terminal $434_{(1)}$ of the synchronous-buck regulator $420_{(1)}$ to the high-side input terminal $402_{(2)}$ of the synchronous-buck regulator $420_{(2)}$ and coupling the low-side output terminal $436_{(1)}$ of the synchronous-buck regulator $420_{(1)}$ to the low-side input terminal $404_{(2)}$ of the synchronous-buck regulator $420_{(2)}$.

After applying an input voltage between the high-side input terminal $402_{(1)}$, and the low-side input terminal $404_{(1)}$ of the synchronous-buck regulator $420_{(1)}$, the output voltage and current measured between the a high-side output terminal $434_{(2)}$ and a low-side output terminal $436_{(2)}$ of the synchronous-buck regulator $420_{(2)}$ will reflect the combined duty ratios of the synchronous-buck regulator $420_{(1)}$ and the synchronous-buck regulator $420_{(2)}$. Preferably, the number of cascaded synchronous-buck regulators should be chosen to obtain maximum efficiency, maximum output power, minimum die size, and maximum duty ratio for the given load. In practice, the number of cascaded s synchronous-buck regulators is preferably between 2 and 5.

In operation, a stepped-down output voltage and current of the synchronous-buck regulator $420_{(1)}$ is applied to the input of the synchronous-buck regulator $420_{(2)}$, which is applied to the next successive-regulator stage until the input of the synchronous-buck regulator $420_{(n)}$ receives the stepped-down output voltage and current of a preceding-regulator stage. The synchronous-buck regulator $420_{(n)}$ then applies its duty ratio to the voltage received on its input so as to provide a final stepped-down voltage and current.

To provide the final stepped-down voltage and current, each cascaded synchronous-buck regulator $420_{(1)}$, $420_{(2)}, \ldots$ and $420_{(n)}$ may operate as described above. To facilitate such operation, each of controllers $426_{(1)}$, $426_{(2)} \ldots$ and $426_{(n)}$ may contain respective pulse-width-modulator-feedback circuits $446_{(1)}, 446_{(2)} \ldots$ and $446_{(n)}$. Each of the pulse-width-modulator-feedback circuits $446_{(1)}$, $446_{(2)}, \ldots$ and $446_{(n)}$, in turn, may include a ramp generator operating in excess of approximately one MHz and a respective output to drive the pulse width modulation of the corresponding switches $428_{(1)}, 428_{(2)}, \ldots$ and $428_{(n)}$. The input to the each of the pulse-width-modulator-feedback circuits $446_{(1)}, 446_{(2)}, \ldots$ and $446_{(n)}$ is fed by the output voltage sensing and/or current sensing from the respective synchronous-buck regulator $420_{(1)}, 420_{(2)}, \ldots$ and $420_{(n)}$.

By way of example, the output voltage of the synchronous-buck regulator $420_{(1)}$ may be detected by pulse-width-modulator-feedback circuits $446_{(1)}$, which is coupled the to high-side input terminal $402_{(2)}$ of synchronous-buck regulator $420_{(2)}$. In one embodiment, the pulse-width-modulator-feedback circuits $446_{(1)}$ compares the output voltage and/or current of the synchronous-buck regulator $420_{(1)}$ against a predetermined reference value to generate a first-stage-error voltage signal. The controller $426_{(1)}$ (via a buffer driver as described above, if included) triggers the switch $428_{(1)}$ to switch from an OFF state to an ON state in accordance with a ramp generator signal in conjunction with the first-stage-error voltage signal, as known in PWM controllers. The difference between output voltage of the synchronous-buck regulator $420_{(1)}$ and the voltage across inductor $424_{(2)}$ causes the current across inductor $424_{(2)}$ to ramp linearly, and to increase the output voltage of synchronous-buck regulator $420_{(2)}$ to a desired value. As noted, the controller $426_{(1)}$ may include a single gate drive and buffer driver as described above and as described in the applications filed concurrently and incorporated by reference herein.

When the output voltage of synchronous-buck regulator $420_{(2)}$ reaches the desired value, the controller $426_{(2)}$ senses a change in the output voltage and/or inductor current of the synchronous-buck regulator $420_{(2)}$ and adjusts the duration of the pulse width modulation of the switch $428_{(2)}$. Within a short delay period of approximately 0 to approximately 100, and preferably about 10, nanoseconds, the controller $426_{(2)}$ may adjust the duration of the pulse width modulation of the rectifier $430_{(2)}$, which may cause the rectifier $430_{(2)}$ to switch from an OFF state to and ON state, assuming that the rectifier $430_{(2)}$ is a synchronous rectifier. If the rectifier $430_{(2)}$ is a diode, then the switching characteristics of the diode determine the amount of delay the after switch $428_{(2)}$ is turned to the OFF state, which should be comparable to the delay period of the synchronous rectifier.

Immediately after the switch $428_{(2)}$ switches to the OFF state the inductor current to "freewheels" through rectifier $426_{(2)}$ and through any load, including the load of any battery being charged, connected across the high-side output node $434_{(2)}$ and the low-side output node $436_{(n)}$. More specifically, once the switch $428_{(2)}$ turns off, the voltage across the rectifier $430_{(2)}$ becomes negative and the rectifier $430_{(2)}$ reaches the forward bias voltage drop, the rectifier $430_{(2)}$ is simultaneously switched from an OFF state to an ON state. After the rectifier 130 switches to the ON state, current flows through the forward-biased body diode of rectifier $430_{(2)}$ and through the channel of the FET. Thereafter, the energy stored in the inductor $424_{(2)}$ begins to decrease as the current flows to the capacitor $422_{(2)}$ and or the load. Eventually, depending on the load condition, the capacitor $422_{(2)}$ will discharge through any connected load until the voltage at the output capacitor $434_{(2)}$ begins to decrease.

The pulse-width-modulator-feedback circuit $446_{(2)}$ compares the output voltage and/or the inductor current of synchronous-buck regulator $420_{(2)}$ with a predetermined reference threshold to generate a second-stage-error voltage signal. The controller $426_{(2)}$ (via the buffer driver described above, if included) triggers the switch $428_{(2)}$ to switch from the OFF state to the ON state in accordance with a ramp generator signal in conjunction with the error voltage signal, as is known in PWM controllers.

Repeating the foregoing procedure for each of the synchronous-buck regulators $420_{(1)}$, $420_{(2)}$ and $420_{(n)}$ may produce a large output currents while exhibiting high efficiency that eliminates the need for a bulky step-down transformer. Eliminating the need for a bulky step-down transformer makes the circuitry amenable to monolithic fabrication.

6. Conclusion

In view of the wide variety of embodiments to which the principles of the present invention can be applied, it should be understood that the illustrated embodiments are exemplary only, and should not be taken as limiting the scope of the present invention. For example, the operation steps may be taken in sequences other than those described, and more or fewer elements may be used in the block diagrams.

Moreover, the claims should not be read as limited to the described embodiments, order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

What is claimed is:

1. A monolithic battery charger comprising:

a step-down converter having a duty ratio in the range of approximately 10 to approximately 95 and comprising at least one monolithically formed buck-type regulator coupled to a capacitor and an inductor, wherein at least one monolithically formed buck-type regulator comprises a switching controller, a switch, and a rectifier in a standard buck configuration, and wherein the controller operates at a switching frequency of at least 1 megahertz; and a battery-terminal interface connected to the step-down converter for providing an output current and an output voltage to a rechargeable battery.

2. The monolithic battery charger of claim 1 wherein said at least one monolithically formed buck type regulator comprises a plurality of serially connected monolithically formed buck-type regulators, wherein each controller operates at a switching frequency of at least one megahertz, and each of which has a duty ratio of between 10 and 95.

3. The monolithic battery charger of claim 2, wherein a cumulative duty ratio comprises the multiplicative combination of the duty ratio for each of the plurality the monolithically formed buck-type regulators.

4. The monolithic battery charger of claim 1, wherein the switch comprises a synchronous switch.

5. The monolithic battery charger of claim 4, wherein the synchronous switch comprises a P-type Metal Oxide Semiconductor switch.

6. The monolithic battery charger of claim 5, wherein the P-type Metal Oxide Semiconductor switch comprises at plurality of P-type Metal Oxide Semiconductor Field Effect Transistor.

7. The monolithic battery charger of claim 1, wherein the rectifier is operable at a frequency of at least one megahertz.

8. The battery charging device of claim 7, wherein the rectifier comprises a synchronous rectifier.

9. The battery charger of claim 8, wherein the synchronous rectifier comprises an N-type Metal Oxide Semiconductor synchronous rectifier.

10. The monolithic battery charger of claim 1, wherein the rectifier comprises a synchronous rectifier, wherein the switch comprises a synchronous switch, wherein the switching controller asynchronously provides a first trigger to the synchronous switch and a second trigger to the synchronous rectifier in synchrony, wherein when the first trigger causes the synchronous switch to cycle from an on state to an off state, the second trigger causes the synchronous rectifier to cycle from an off state to an on state, and wherein when the first trigger causes the synchronous switch to cycle from the off state to the on state, the second trigger causes the synchronous rectifier to cycle from the on state to the off state.

11. The monolithic battery charger of claim 10, wherein the switching controller comprises a single gate driver.

12. The monolithic battery charger of claim 10, wherein the switching controller comprises a single gate driver and a buffer driver.

13. The monolithic battery charger of claim 10, further comprising a current-sensing feedback controller.

14. The monolithic battery charger of claim 10, further comprising a voltage-sensing feedback controller.

15. The monolithic battery charger of claim 1, wherein the switching controller comprises a single gate driver.

16. The monolithic battery charger of claim 1, wherein the switching controller comprises a single gate driver and a buffer driver.

17. The monolithic battery charger of claim 1, further comprising a current-sensing feedback controller.

18. The monolithic battery charger of claim 1, further comprising a voltage-sensing feedback controller.

19. A monolithic battery charger comprising, in combination:

a first monolithically formed buck type regulator comprising:

a first P-type Metal Oxide Semiconductor switch having a first terminal for coupling to a high-side terminal of an external power supply, a first synchronous N-type Metal Oxide Semiconductor rectifier having a first terminal coupled in series with a second terminal of the first P-type Metal Oxide Semiconductor switch at a first node, a first inductor having a first terminal coupled in series with the second terminal of the first P-type Metal Oxide Semiconductor switch at the first node, a first capacitor having a first terminal coupled to the second terminal of the first monolithically-formed inductor at a first-output node and having a second terminal for coupling to a low-side terminal of the external power supply at a ground node; and a first control circuit having (i) at least one input for receiving at least one feedback signal that is based on output signals detected at the first-output node, (ii) logic for generating switching signals to control the P-type Metal Oxide Semiconductor switch in response to the at least one feedback signal, and (iii) an output for triggering the first P-type Metal Oxide Semiconductor switch in response to the switching signals; and a second monolithically formed buck type regulator coupled in series with the first monolithically formed buck type regulator, the second monolithically formed buck type regulator comprising:

a second P-type Metal Oxide Semiconductor switch having a first terminal coupled to the first-output node of the first monolithically formed buck type regulator, a second synchronous N-type Metal Oxide Semiconductor rectifier having a first terminal coupled in series with a second terminal of the second P-type Metal Oxide Semiconductor switch at a second node, a second inductor having a first terminal coupled in series with the second terminal of the second P-type Metal Oxide Semiconductor switch at the second node, a second capacitor having a first terminal coupled to the second terminal of the second monolithically-formed inductor at a second-output node and having a second terminal coupled to the ground node; and a second control circuit having (i) at least one input for receiving at least one feedback signal that is based on output signals detected at the second-output node, (ii) logic for generating switching signals to control the P-type Metal Oxide Semiconductor switch in response to the at least one feedback signal, and (iii) an output for triggering the second P-type Metal Oxide Semiconductor switch in response to the switching signals; and a battery-terminal interface coupled to the second-output node and the ground node, wherein the battery-terminal interface provides an output current and an output voltage to a rechargeable battery, wherein first control circuit and the second control circuit a control circuit r operate at a switching frequency of at least 150 megahertz.

20. The monolithic battery charger of claim 19, wherein the first control circuit further includes logic for generating switching signals to control the first-N-type Metal Oxide Semiconductor rectifier in response to the at least one feedback signal, and a second output for triggering the first N-type Metal Oxide Semiconductor switch in response to the switching signals.

21. The monolithic battery charger of claim 20, wherein the second control circuit further includes logic for generating switching signals to control the second-N-type Metal Oxide Semiconductor rectifier in response to the at least one feedback signal, and a second output for triggering the second-N-type Metal Oxide Semiconductor switch in response to the switching signals.

22. The monolithic battery charger of claim 20, wherein the first control circuit further includes a single gate driver and a buffer driver.

23. The monolithic battery charger of claim 19, wherein the first control circuit further includes a current-sensing feedback controller.

24. The monolithic battery charger of claim 19, wherein the first control circuit further includes a voltage-sensing feedback controller.

25. The monolithic battery charger of claim 19, wherein the second control circuit further includes logic for generating switching signals to control the second-N-type Metal Oxide Semiconductor rectifier in response to the at least one feedback signal, and a second output for triggering the second-N-type Metal Oxide Semiconductor switch in response to the switching signals.

26. The monolithic battery charger of claim 25, wherein the second control circuit further includes a single gate driver and a buffer driver.

27. The monolithic battery charger of claim 19, wherein the second control circuit further includes a current-sensing feedback controller.

28. The monolithic battery charger of claim 19, wherein the second control circuit further includes a voltage-sensing feedback controller.

29. The monolithic battery charger of claim 19, wherein the first and second monolithically formed buck type regulators are formed on a single substrate.

* * * * *

UNITED STATES PATENT AND TRADEMARK OFFICE
CERTIFICATE OF CORRECTION

| | | |
|---|---|---|
| PATENT NO. | : 6,791,298 B2 | Page 1 of 1 |
| APPLICATION NO. | : 10/288177 | |
| DATED | : September 14, 2004 | |
| INVENTOR(S) | : Krishna Shenai et al. | |

It is certified that error appears in the above-identified patent and that said Letters Patent is hereby corrected as shown below:

In Col. 15, line 62, after "wherein" insert --the--.
In Col. 16, line 20, delete "at" and insert --a--.
In Col. 16, line 22, delete "Transistor" and insert --Transistors--.
In Col. 18, line 4, after "wherein" insert --the--.
In Col. 18, line 5, delete "a control circuit r".

Signed and Sealed this
Seventeenth Day of January, 2012

David J. Kappos
*Director of the United States Patent and Trademark Office*

Disclaimer

6,791,298 B2 — Krishna Shenai, Naperville, IL (US) and Siamak Abedinpour, Chandler, AZ (US). MONOLITHIC BATTERY CHARGING DEVICE. Patent dated September 4, 2004. Disclaimer filed June 11, 2014, by the inventors.

Hereby disclaim complete claims 1, 4-18 of said patent.

(*Official Gazette, Jul. 22, 2014*)

(12) INTER PARTES REVIEW CERTIFICATE (32nd)
United States Patent
Shenai et al.

(10) Number: US 6,791,298 K1
(45) Certificate Issued: Oct. 14, 2014

(54) MONOLITHIC BATTERY CHARGING DEVICE (75) Inventors: Krishna Shenai; Siamak Abedinpour (73) Assignee: UniFi Scientific Batteries, LLC

Trial Number:

IPR2013-00213 filed Mar. 26, 2013

Petitioner: Texas Instruments Incorporated; Samsung Electronics Co., Ltd.

Patent Owner: UniFi Scientific Batteries, LLC

Inter Partes Review Certificate for:

Patent No.: 6,791,298
Issued: Sep. 14, 2004
Appl. No.: 10/288,177
Filed: Nov. 5, 2002

The results of IPR2013-00213 and IPR2013-00236 are reflected in this inter partes review certificate under 35 U.S.C. 318(b).

INTER PARTES REVIEW CERTIFICATE
U.S. Patent 6,791,298 K1
Trial No. IPR2013-00213
Certificate Issued Oct. 14, 2014

AS A RESULT OF THE INTER PARTES REVIEW PROCEEDING, IT HAS BEEN DETERMINED THAT:

Claims 1 and 4-18 are disclaimed.

\* \* \* \* \*